United States Patent [19]

De Longe

[11] 4,225,431

[45] Sep. 30, 1980

[54] PROCESS AND APPARATUS FOR THE TREATMENT OF AQUEOUS WASTE MATERIALS

[75] Inventor: Harry C. De Longe, Katonah, N.Y.

[73] Assignee: PepsiCo, Inc., Purchase, N.Y.

[21] Appl. No.: 974,045

[22] Filed: Dec. 28, 1978

Related U.S. Application Data

[63] Continuation-in-part of Ser. No. 832,238, Sep. 12, 1977, abandoned.

[51] Int. Cl.$^2$ ............................ C02C 5/06; C02C 5/10
[52] U.S. Cl. ..................................... 210/617; 210/151; 210/195.1; 210/202; 210/206; 210/624; 210/760; 210/627
[58] Field of Search ......................... 210/2, 3, 8, 9, 14, 210/15, 17, 18, 63 Z, 195.1, 196, 199–202, 206, 252, 150, 151, 63 R, 65–67; 134/10, 109–111

[56] References Cited

U.S. PATENT DOCUMENTS

| | | | |
|---|---|---|---|
| 3,403,095 | 9/1968 | Chipperfield et al. | 210/17 |
| 3,546,114 | 12/1970 | Dietz et al. | 210/63 Z |
| 3,660,277 | 5/1972 | McWhirter et al. | 210/63 Z |
| 3,794,582 | 2/1974 | Lackme et al. | 210/195 R |
| 4,007,118 | 2/1977 | Ciambrone | 210/150 |
| 4,008,159 | 2/1977 | Besik | 210/63 Z |
| 4,080,287 | 3/1978 | Conway et al. | 210/17 |
| 4,132,637 | 1/1979 | Key et al. | 210/63 Z |

*Primary Examiner*—Benoit Castel
*Attorney, Agent, or Firm*—Scully, Scott, Murphy & Presser

[57] ABSTRACT

A process and apparatus for the treatment of aqueous waste materials or effluents, particularly the aqueous waste materials of bottling plants and installations, in which a trickling element is employed for the basic rough processing to effect the removal of biological oxygen demand (BOD). The discharge stream of effluent from the trickling element is conveyed into an oxidation-reaction tank, providing for the chemical oxidation of light organic floc resulting from biological action in the trickling element and further BOD reduction, and for the oxidation of any biomass sloughing off the media in the trickling element. The treated waste material or effluent discharge emanating from the oxidation-reaction tank is conducted through a mixing tank which is adapted to simultaneously receive the final rinse waste effluent from the bottling plant, and to intermix the two effluents and subject these to further oxidation treatment through the intermediary of admixing air therewith. The effluent from the mixing tank is conveyed into an aeration tank which provides for a lengthy period of detention and a circuitous flow path of the effluent so as to subject the waste material or effluent stream conducted therethrough to the maximum extent of aeration. A settling tank is adapted to receive light organic floc resulting from the aeration process in the aeration tank, and separate the waste material or effluent into a liquid portion and a solids-containing portion. A solids separator is adapted to receive an effluent comprising the solids-containing portion of the effluent from the settling tank and, additionally, any solids from backwash water from the bottling plant or water treatment recycling system.

24 Claims, 4 Drawing Figures

PROCESS AND APPARATUS FOR THE TREATMENT OF AQUEOUS WASTE MATERIALS

This application is a continuation-in-part of patent application Ser. No. 832,238 for PROCESS AND APPARATUS FOR THE TREATMENT OF AQUEOUS WASTE MATERIALS, by Harry C. DeLonge, filed Sept. 12, 1977, now abandoned.

BACKGROUND OF THE INVENTION

1. Field of the Invention

The present invention relates to a process and apparatus for the treatment of waste water and, more particularly, relates to a process and apparatus which will effectuate the combined biological and physical-chemical treatment of waste effluents to remove biological oxygen demand (BOD) and provide a clarified discharge through the application of an oxidation process. More specifically, the invention relates to a combined biological and physical-chemical process and apparatus for treating the aqueous waste materials or effluent discharged from beverage bottling plants or installations.

2. Discussion of the Prior Art

At present, aqueous waste material or effluent from various bottling plants and installations is discharged to receiving waters or drains without any treatment being applied thereto. Alternatively, waste or effluents are treated through the selective utilization of two basic biological systems, such as the "activated sludge" and the "trickling element" (also known as a trickling filter) processes, both of which are proven systems having been currently employed for a lengthy period of time. However, the known activated sludge process is readily upset by intermittent flows or slug loadings, and equalization of applied flows or loadings in waste treatment processes of this type has proven to be difficult and expensive. Moreover, when applied to bottling installations, particularly soft drink and brewery plants, the activated sludge process has resulted in bulking problems due to the presence of carbohydrate concentrations in the effluent, and in the destruction of the biological waste treating process caused by the discharge of caustic materials into the system. In essence, since bottling plants generally process and recondition for repeated use "returnable" bottles, a primary source of aqueous waste material or effluents lies in the bottle washing system, whereas secondary sources of effluents are caused by the wash-down of the filler-crowner units, periodic wash-down of plant tanks and piping at the end of each day's production or on product change-over, plant floor area drainage, and solids emanating from the plant water treatment facilities.

Essentially, the plant waste treatment systems are protected by suitable process strainers against damage by major particulate solids, such as glass particles caused by bottle breakage, and other large-sized impurities. Usually, bottling plants do not discharge oils, greases or other deleterious substances so that, in this instance, they are not of any particular significance. In practice it has been found that returnable bottles which are conveyed to a bottle washing machine are sprayed by liquid jets for initial cleaning thereof and to remove debris, and are then soaked in a caustic soda solution, following which they are sprayed with potable water to remove any caustic residuals. The wastes or effluents from the initial washing operation, which is generally referred to as "pre-rinse", are collected separately and usually represent 15% of the continuous waste flow and contain more than 70% of the BOD (biological oxygen damand) loading of a bottling plant.

Effluents from the subsequent bottle washing process, commonly referred to as "final rinse", are collected after the bottles are conveyed through a warm and cold water wash to remove the last particles of caustic soda, with the final rinse water generally representing a major portion of the continuous waste flow and containing not more than 20% of the BOD loading.

Another fraction of the effluent or waste, commonly referred to as "bottling and support area drainage", is discharged during washing of the filler-crowner units, and during plant tank and piping cleaning and sanitizing. Wash-down of the bottling process equipment is effected at the end of each day's production or at the time of product changeover. The estimated waste from these sources is not part of a continuous waste flow but is periodic, and usually may represent approximately 5% of the total daily waste or effluent volume, and about 4% of the total daily BOD loading.

Effluents from the water treatment facilities, referred to as "backwash water", result from backwashing of the sand carbon filtration units and from regeneration of water softeners. Based on plant piping arrangements, the unit washing and backwashing of filters sequences are not carried out concurrently but, rather, backwashing is performed at the end of each day's operation.

Thereafter, the effluents or aqueous waste materials from each of the four primary effluent sources, namely, pre-rinse, final rinse, bottling and support area drainage, and backwash water, is separately piped to the waste treatment facilities for separate handling and processing.

Investigations have indicated that excellent results are obtained in the treatment of aqueous waste materials or effluents, particularly when applied to beverage or soft drink bottling plants, by a combination of biological and physical-chemical process steps wherein a trickling element is utilized in combination with the subsequent aeration and chemical treatment of the effluent. In that instance, particularly advantageous results are obtained through the intermediary of a trickling element employed in a roughing process for the removal of biochemical oxygen demand (BOD), followed by a sequence of oxidation processes employing aeration and ozonation to thereby produce an acceptable effluent meeting the most demanding and stringent environmental standards and conditions.

SUMMARY OF THE INVENTION

In accordance with the present invention, there is provided a novel and proved process and apparatus for the treatment of aqueous waste materials or effluents, particularly the aqueous waste materials of bottling plants and installations, in which a trickling element is employed for the basic rough processing to effect the removal of biological oxygen demand (BOD), and in which the trickling element is preferably constituted of a trickling tower filled with a filter media formed of a plastic material on which biological growth forms to degrade BOD. The invention further contemplates the utilization of sequential physical-chemical aeration processes following the rough processing by the trickling element, wherein the discharge stream of effluent from the trickling element is conveyed into an oxidation-reaction tank, providing for the chemical oxidation of light organic floc resulting from biological action in the trickling element and for further BOD reduction, and for the oxidation of any biomass sloughing off the element media. Furthermore, the trickling tower may also be adapted to continuously receive recycled portions of the effluent from the oxidation-reaction tank. Moreover, in addition to the trickling element effluent, waste material is adapted to enter the oxidation-reaction tank from the bottling and support area drainage of the bottling plant, and from a solids separator overflow.

The oxidation-reaction tank provides for a circuitous flow path for the effluent being conveyed therethrough, with the optional addition of an oxygen-bearing gas, such as ozone, to the waste material, being effected at least at one location of the oxidation-reaction tank to enhance the rate of oxidation of the effluent. Additionally, in order to further accelerate the oxidation reaction, the oxidation-reaction tank is enclosed and maintained under a pressure higher than atmospheric.

The treated waste material or effluent discharge emanating from the oxidation-reaction tank is conducted through the mixing tank which is adapted to simultaneously receive the final rinse waste effluent from the bottling plant, and to intermix the two effluents and subject these to further oxidation treatment through the intermediary of admixing air therewith.

In a further aspect of the invention, the effluent from the mixing tank is conveyed into an aeration tank which provides for a lengthy period of detention and a circuitous flow path of the effluent so as to subject the waste material or effluent stream conducted therethrough to the maximum extent of aeration. A settling tank is adapted to receive light organic floc resulting from the aeration process in the aeration tank, and separate the waste material or effluent into a solids-containing portion which will gravitate towards the preferably trough-shaped bottom of the settling tank from whence it is piped out through a suitable outlet piping arrangement. A solids separator is adapted to receive an influent comprising the solids-containing portion of the effluent from the settling tank and, additionally, any backwash water from the bottling plant or water treatment recycling system. Moreover, the invention provides for a suitable source for effecting the lowering and control over the pH adjustment of the waste material to a level lower than that ordinarily attained through the ozonation and aeration processes, and also providing for the infeed of chemicals to the waste material or effluent along various stages of the aeration processes.

Accordingly, it is an object of the present invention to provide a novel and improved process for the treatment of effluents in an efficient and continuous manner.

A more particular object of the present invention lies in the provision of a process for the continuous biological and physical-chemical treatment of industrial effluents, particularly aqueous waste materials discharged from beverage bottling plants or systems.

Still another object of the present invention lies in the provision of an apparatus for effectuating the above-mentioned waste water treatment processes in a continuous and economical manner, which will utilize a trickling element and a sequence of series-flow connected ozonation and aeration components for effectively removing biological oxygen demand through an oxidation process.

BRIEF DESCRIPTION OF THE DRAWINGS

The foregoing and other objects and advantages of the inventive process and apparatus pursuant to the teachings of the present invention may be more readily understood by one skilled in the art, having reference to the following detailed description of a preferred embodiment thereof, taken in conjunction with the accompanying drawings, in which.

DETAILED DESCRIPTION

Figure 1:
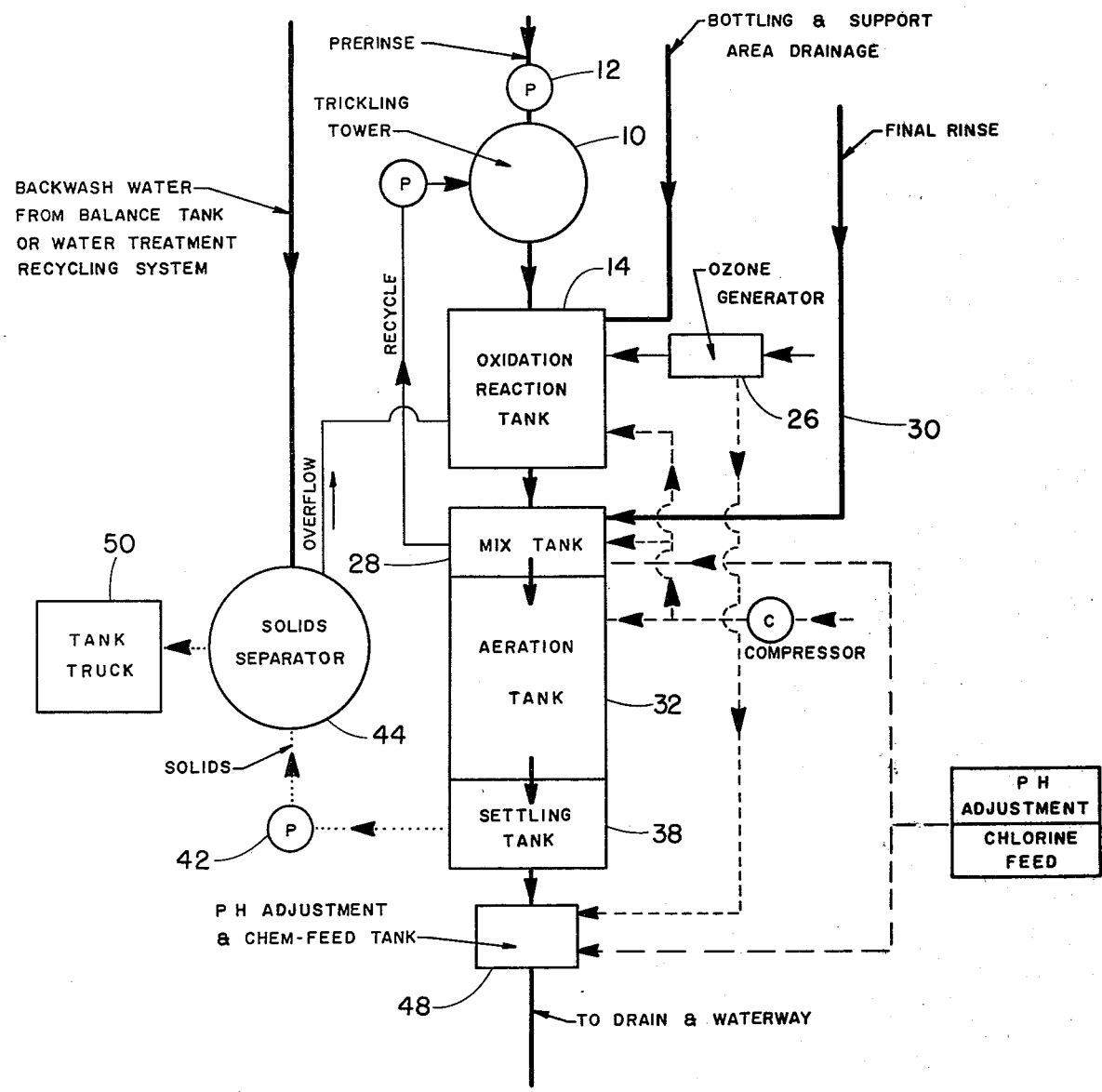
FIG. 1 is a schematic representation of an apparatus for the oxidation treatment of an aqueous waste material or effluent pursuant to the invention.

Referring now in detail to the drawings, illustrative of a waste water treatment installation or apparatus for the continuous oxidation treatment of an effluent, as illustrated in FIG. 1, there is disclosed a trickling element 10 which is adapted to receive the pre-rinse effluent or aqueous waste water from industrial installation, such as a beverage bottling plant (not shown), through the intermediary of a circulation pump 12. Preferably, the trickling element 10 is a trickling tower, constructed of coated steel or equivalent material, and filled with a filter media formed of a plastic material on which biological growth forms to degrade BOD. The utilization of a plastic material biological filter media is generally preferred over stone media in view of the higher surface areas available per unit of volume, which will impart superior flow characteristics to the trickling tower.

Figure 2:
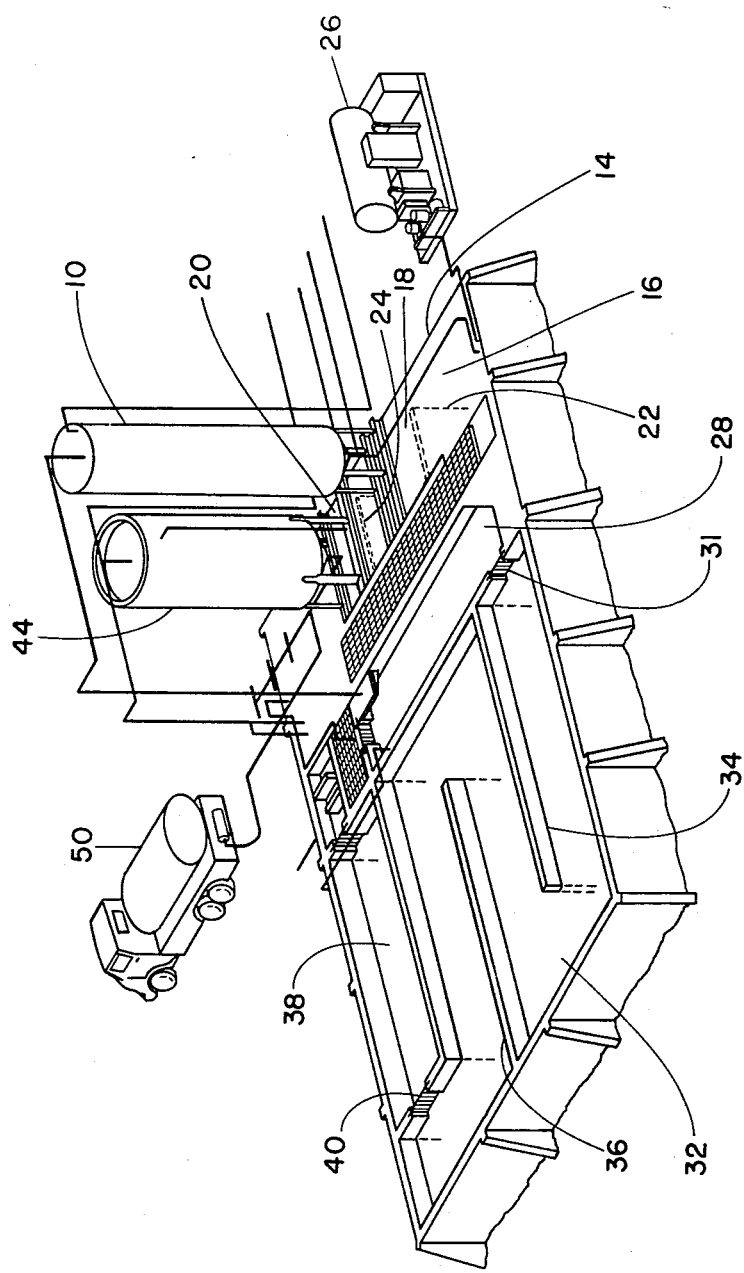
FIG. 2 is a perspective view of an installation for the treatment of effluent.
Figure 3:
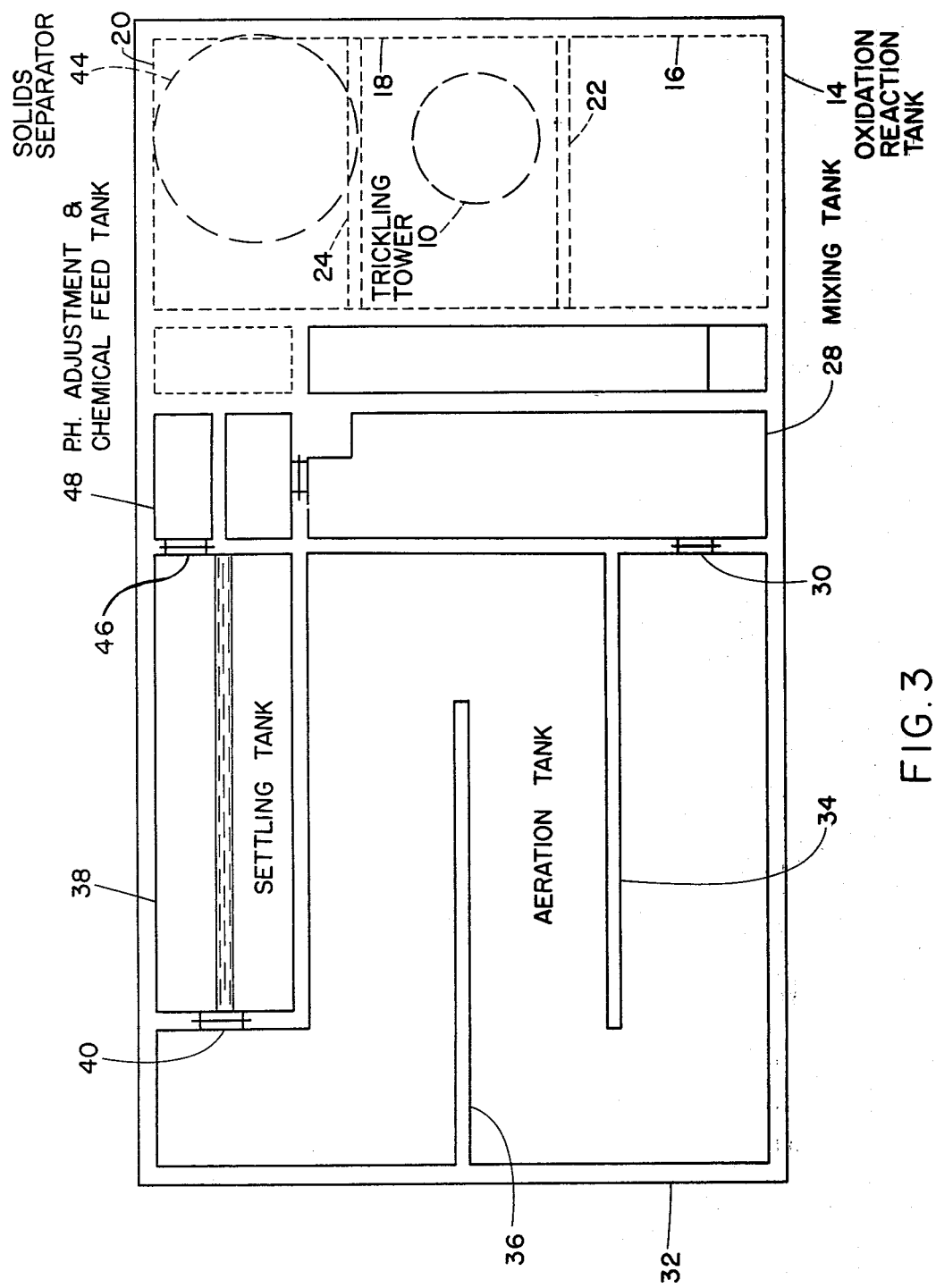
FIG. 3 is a generally schematic plan view of the effluent treatment installation of FIG. 2.

The outlet of the trickling tower is connected to an oxidation-reaction tank 14. As illustrated in detail in FIGS. 2 and 3 of the drawings, the oxidation-reaction tank is constructed of a closed receptacle or vessel having three series-connected flow compartments 16, 18 and 20. The discharge stream or effluent from the trickling tower 10 is conducted through suitable inlet piping into the inlet compartment 16 of the oxidation-aeration tank 14, from whence the stream is then conducted into compartment 18 and, thereafter, into compartment 20. Preferably, the interior of the oxidation-reaction tank 14 is maintained under pressure of about 0.11 to 0.14 kg per $cm^2$ (2 psig). The compartments 16, 18 and 20 are baffled through the interposition of generally upright baffle walls 22 and 24 over which there flows the effluent so as to minimize any short-circuiting or return flow of the waste material being conducted therethrough.

In order to further enhance the degree of oxidation of the waste material or effluent in the closed, pressurized oxidation-reaction tank 14, an oxygen-bearing gas, such as ozone, is conducted into the compartment 16 by means of a suitable ozone generator 26. The other two compartments, 18 and 20 have air injected thereinto in order to aid in the oxidation or aeration of the aqueous waste material. Suitable bubbling diffusers (not shown) are employed in each of the compartments for the injection of the air and ozone so as to insure a maximum degree of admixing with the effluent.

If desired, at least a portion of the effluent from the oxidation-reaction tank 14 may be continuously recycled to the trickling tower 10 and passed through the filter media therein.

A mixing tank 28 which is open to atmosphere is adapted to receive the effluent discharge stream from the oxidation-reaction tank 14 and, more particularly, from the last compartment 20 thereof through a weir 31 which will control the discharge flow rate from the oxidation-reaction tank 14. Additionally, the mixing tank 28 is adapted to simultaneously receive final rinse wastes through an inlet conduit from the industrial installation or bottling plant. The two streams of waste material or effluent are admixed in the mixing tank 28, with further oxidation or aeration treatment being imparted to the aqueous waste material by admixing air therewith. In order to enhance the rate of oxidation, the air may be diffused through the tank employing the same type of bubbling diffusers (not shown) as are utilized in the oxidation-reaction tank 14. Moreover, provision may be made for adjusting the pH of the waste material in the mixing tank, as described in greater detail hereinbelow.

An aeration tank 32 which, similar to the mixing tank 28, is open to atmosphere, is adapted to receive the effluent discharge stream from the mixing tank, and is provided with upright walls or baffles 34 and 36 in order to impart a circuitous flow path to the waste material conducted therethrough. Suitable bottom diffusers (not shown) may be installed in the aeration tank 32 for supplying a predetermined volumetric flow of air into the tank and to also impart a spiral flow pattern to the waste material or effluent as it is conducted through the tank in order to enhance the rate of oxidation of the effluent.

A settling tank 38, which has an essentially V-shaped trough bottom, is connected to the aeration tank 32 so as to be able to receive light organic floc from the latter over a flow regulating weir 40. The settling tank 38 may be suitably baffled to distribute flow therethrough in a uniform manner. As solids suspended in the effluent settle towards the trough-shaped bottom of the settling tank, they are withdrawn through the intermediary of a slotted pipe and a suction pump 42 towards a solids separator 44. The liquid portion of the effluent is conducted from the settling tank through an adjustable flow-controlling weir 46 to a pH adjustment and chemical feed tank 48. Control over the pH of the effluent may be effected by dosage with muriatic acid. Moreover, chlorine feed may be made available from a source of hypochlorite solution.

The pH adjusting muriatic acid and chlorine may also be added to the effluent in the mixing tank 28. Similarly, ozone from the ozone generator 26 may be introduced into the liquid portion of the effluent which is conducted into the pH adjustment tank 48. Additionally, chemicals may be added to the waste material flow through the oxidation-reaction tank 14 for the chemical treatment thereof. These chemicals may be supplied from the chemical feed supply from the same source which supplies chemical feed tank 48.

The solids separator 44, which preferably is a tank open to atmosphere, has a hopper bottom from which solids may be discharged to an adjacent tank truck 50 or, alternatively, to any available sludge drying beds.

As may be readily appreciated, the trickling tower 10 and the solids separator 44, both of which may be superimposed on the upper surface of the oxidation-reaction tank 32 in order to reduce the spatial requirements of the apparatus, are each constructed of coated steel, or a similar material. On the other hand, the oxidation-reaction tank 14, mixing tank 28, aeration tank 32, settling tank 38, and pH adjustment and chemical feed tank 48 may each be fabricated of concrete or lined masonry walls.

A process for the treatment of aqueous waste material or effluent discharge from a beverage or soft drink bottling plant employing the above-described apparatus is now set forth hereinbelow.

Thus, the waste constituents in bottling plant discharges or effluents which require treatment are primarily sugar, derived solids from product residues, and carryovers from the caustic bottle washing. As previously mentioned, the identified strongest concentration of BOD waste is in the bottling pre-rinse discharge, with the backwash water containing significant concentrations of suspended solids.

The effluent from the bottling plant to the trickling tower 10 comprises primarily two waste sources, namely, pre-rinse effluent and a portion of the discharge flow from the mixing tank 10. The effluent or aqueous waste material from the bottling plant is conducted through and initially treated in the trickling tower, the latter of which is provided with a plastic material filter bed as the biological surface media, since the use of plastic is preferred over stone media in view of the higher surface areas available per unit of volume. The probable efficiency of the trickling tower is estimated to afford approximately a 70% reduction of the BOD in the effluent.

The discharge stream from the trickling tower is conducted into and detained within oxidation-reaction tank 14 which, as indicated hereinabove, is compartmented and of closed construction. Pressure is maintained within the oxidation-reaction tank through a suitable compressor in order to enhance the rate of oxidation of the effluent conducted therethrough. An oxygen-bearing gas, preferably ozone, is introduced into the inlet portion or compartment of the oxidation-reaction tank from the ozone generator 26. This ozone treatment provides for an enhanced clarity of the treated water and effluent by destroying color and, concurrently, formulates a sterilizing agent. Moreover, the ozone will destroy soluble BOD in the effluent without generating solids. Air is added to the other compartments to aid in the oxidation of the waste material.

From the oxidation-reaction tank, the discharge stream is conveyed into and detained in mixing tank 28 wherein the discharge stream is admixed with a final rinse effluent from the bottling plant entering through inlet conduit 30. If desired, at least a portion of the effluent from the oxidation-reaction tank may be continuously recycled to the trickling tower 10. Simultaneously, air is admixed with the two combined effluent streams in the mixing tank under atmospheric pressure. PH adjustment of the effluent through the addition of muriatic acid, and the addition of chlorine for chemical treatment may also be imparted to the waste effluent in the mixing tank.

The discharge stream from the mixing tank is conducted into aeration tank 32, the latter of which imparts a circuitous flow path and spiral flow pattern to the effluent in order to further assist in the aeration or oxidation of the effluent.

Thereafter, the discharge stream from the aeration tank is conducted in a controlled flow into settling tank 38 wherein the flow of light organic floc resulting from the aeration process entering the settling compartment is baffled to uniformly distribute the flow. The solids portion of the effluent is removed through a V-shaped trough bottom by means of a slotted type conduit and withdrawn through a suitable outlet valve. Concurrently, the liquid portion of the effluent is conducted into a pH adjustment and chemical feed tank 48.

The solids portion from the settling tank is conducted through pump 42 into solids separator 44 from whence it is then conveyed into a tank truck or sludge drying bed for final disposition thereof. The liquid fraction of the effluent is conducted from the pH adjustment and chemical feed tank 48 to a drain and waterway, after suitable addition of ozone from ozone generator 26, and the further addition of muriatic acid and chlorine, as required, in a manner similar to that supplied to the mixing tank 28. Chemicals may also be added to the waste material flow passing through the oxidation-reaction tank 14.

The solids separator 44 is also adapted to receive any solids from backwash water from the balance tank of the bottling plant or water treatment recycling system, whereas the liquid overflow from the solids separator is adapted to be conducted into the oxidation-reaction tank for reentrainment and recycling into the waste water treatment system.

Although the foregoing apparatus and process has been described in particularity with regard to a bottling plant or installation, it is readily apparent to one skilled in the art that the inventive waste water treatment process and apparatus has applicability to practically all types of industrial installations in which concentrations of large-sized solids are not present in the effluent.

Figure 4:
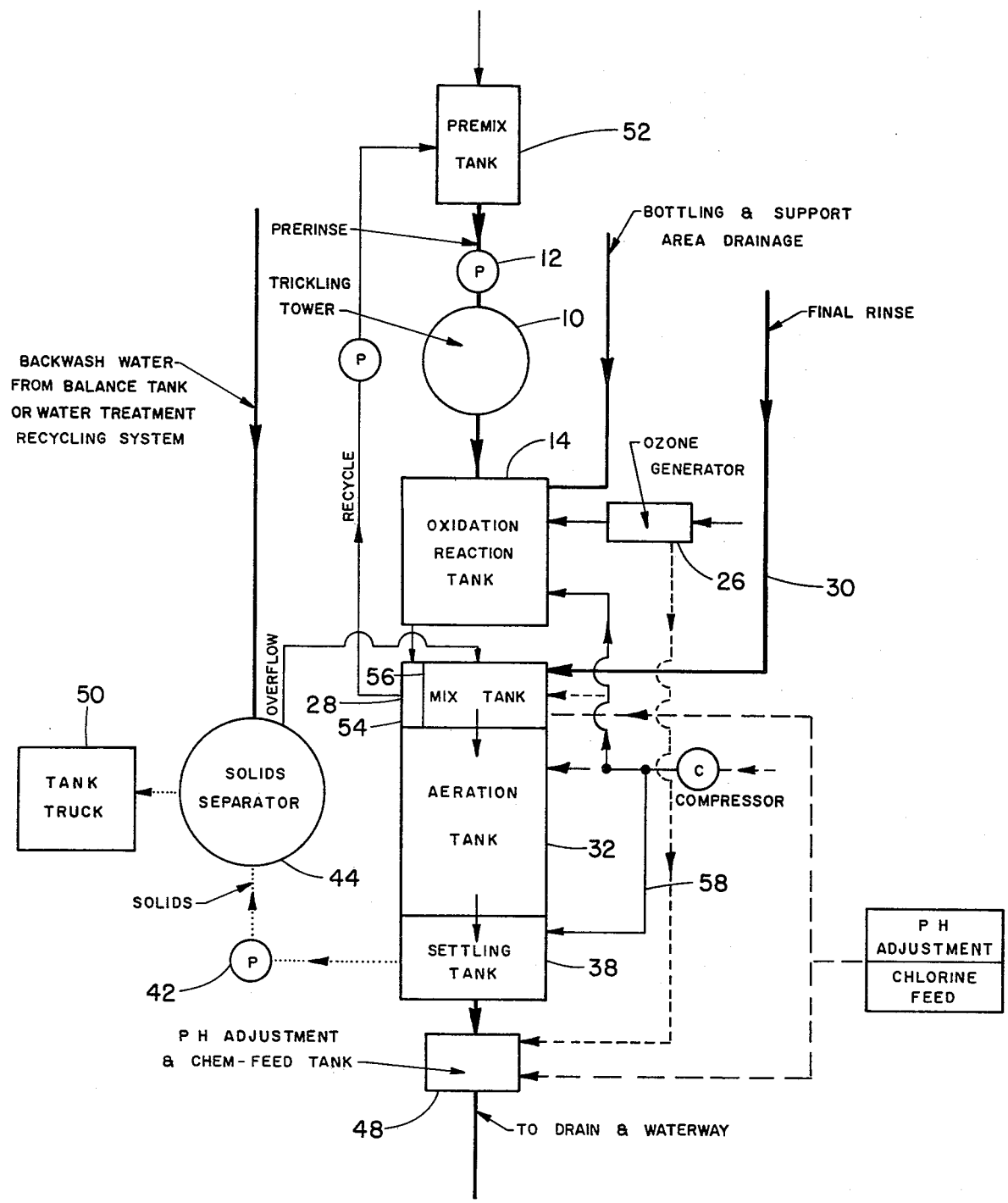
FIG. 4 is a schematic representation of a second, preferred embodiment of apparatus and a process for the oxidation treatment of aqueous waste materials or effluent.

FIG. 4 is a schematic representation of a second, preferred embodiment of apparatus and a process for the oxidation treatment of aqueous waste effluent. The embodiment of FIG. 4 represents an improvement over the embodiment of FIG. 1, having been developed as a refinement thereover. This embodiment of the invention is similar in operation in many aspects to that illustrated in FIG. 1, and accordingly the detailed description of this apparatus will be explained only insofar as it differs therefrom. In this embodiment, as with that also in FIG. 1, portions of the system and process which are considered to be very important are indicated by solid lines, whereas portions of the system and process which are optional in nature are indicated by dashed lines. In this regard, the embodiment of FIG. 4 differs from that in FIG. 1 in that the line from the compressor to the oxidation-reaction tank has been solidified, indicating that it has been recognized to be a more important part of the system and process. Likewise, a solid line 58 has been added extending from the compressor to the settling tank, with the additional line being solid to indicate that it is recognized to be an important part of the process. Further, a premix tank 52 is added to receive the pre-rinse effluent or aqueous waste water from the industrial installation. The recycle from the mixing tank is now pumped directly to the premixing tank 52, rather than to the trickling tower 10. The recycle then flows from the premixing tank 52 into the trickling tower 10. Another difference in this embodiment is that the output of the oxidation reaction tank 14 is directed to a portion 54 of the mixing tank which is separated from the remainder thereof by a weir 56, and the mixing tank 28 receives the overflow directly from the solids separator 44. Also in the illustrated embodiment ozone under pressure (several tenths of a psi) is directed into the oxidation-reaction tank 14. This is an important aspect of the system and process as the unique action of the ozone in the oxidation-reaction tank causes the color of the aqueous effluent to be greatly clarified.

What is claimed is:

1. An oxidation process for the treatment of an aqueous waste material effluent from a plant for filling containers with a beverage, comprising the steps of:
   (a) passing an influent constituted of said aqueous waste material through a trickling element having a media therein having biological growth formed thereon to degrade BOD to form an aqueous waste material discharge stream;
   (b) oxidizing light organic floc resulting from biological action in said trickling element and also any biomass sloughing off the trickling element media to further remove BOD by passing the aqueous waste material discharge stream from said trickling element into an oxidation-reaction tank, also conveying waste material from the beverage container filling plant into said oxidation-reaction tank, adding a flow of an oxygen-bearing gas to said oxidation-reaction tank for enhancing the chemical oxidation of the thusly combined aqueous waste materials detained therein, and detaining said discharge stream in said oxidation-reaction tank for a predetermined time interval to provide chemical oxidation therein before discharging it in a stream;
   (c) admixing the discharge stream from said oxidation-reaction tank and a final rinse waste effluent from the beverage filling plant with air to effect oxidation treatment of said aqueous waste material in a mixing tank before discharging it in a stream;
   (d) conveying the discharge stream from said mixing tank into an aeration tank imparting a circuitous flow path to the aqueous waste material therethrough while providing for aeration of the aqueous waste material, as through the imparted circuitous flow, and detaining said waste material in said aeration tank for a predetermined time interval before discharging it in a stream;
   (e) separating the discharge stream from said aeration tank into a liquid portion and a waste solids-containing portion by passing it to a settling tank adapted to receive light organic floc from the preceding aeration process; and
   (f) separately conveying a discharge stream containing said waste solids-containing portion from said settling tank to a solids separator and concurrently withdrawing the treated liquid portion of said effluent for removal from said process.

2. A process as claimed in claim 2, said step of adding a flow of an oxygen-bearing gas comprising the step of adding a flow of ozone.

3. A process as claimed in claim 1, said oxidation-reaction tank including a plurality of series-connected flow compartments for conducting said aqueous waste material therethrough, comprising adding said oxygen-bearing gas to the first of said compartments and aerating the remainder of said compartments.

4. A process as claimed in claim 1, comprising adjusting the pH of said liquid effluent discharged from said settling tank.

5. A process as claimed in claim 4, said pH being adjusted through the addition of muriatic acid.

6. A process as claimed in claim 1, comprising treating the liquid effluent discharged from said settling tank through the addition of chlorine.

7. A process as claimed in claim 1, comprising adding chlorine to the aqueous waste material conveyed through said mixing tank.

8. A process as claimed in claim 1, comprising adding ozone to the effluent liquid portion discharged from said settling tank.

9. A process as claimed in claim 1, comprising recycling excess liquid from waste solids-containing portion in said solids separator to said oxidation-reaction tank.

10. A process as claimed in claim 1, comprising recycling a portion of said waste material from said mixing tank to said trickling element utilized in said passing step.

11. A process as claimed in claim 1, wherein said trickling element includes plastic material having thereon a biological media.

12. A process as claimed in claim 1, wherein said process is utilized in the treatment of waste material effluent from bottling plants and bottle washing systems, comprising conveying waste material from the bottling plant and support area drainage into said oxidation-reaction tank.

13. A process as claimed in claim 12, comprising conveying backwash water from a balance tank of said bottling plant to said solids separator.

14. A process as claimed in claim 12, comprising conveying aqueous waste material from a water treatment recycling system into said solids separator.

15. An apparatus providing for oxidation treatment of an aqueous waste material effluent from a plant for filling containers with a beverage, comprising:
 (a) a trickling element having means coupled to receive said effluent, including a media on which biological growth forms to degrade BOD for initially treating said effluent before discharging it in a stream;
 (b) an oxidation-reaction tank having means coupled to receive the discharge stream of said waste material from said trickling element and also including means coupled to receive the waste material from the beverage container filling plant and support area drainage and means for detaining said waste material therein for a predetermined time interval, before discharging it in a stream, to subject it to means providing for chemical oxidation of light organic floc resulting from biological action in said trickling element and oxidation of any biomass sloughing off said media and to further remove BOD, and including means for adding an oxygen-bearing gas to the oxidation-reaction tank;
 (c) a mixing tank, having means coupled to receive the discharge stream from said oxidation-reaction tank, and means for receiving a final rinse waste effluent from the beverage filling plant including means for admixing said waste material with atmospheric air before discharging it in a stream;
 (d) an aeration tank having means coupled to receive the discharge stream from said mixing tank including means for imparting a circuitous flow path to said waste material through said aeration tank and means for detaining said waste material therein for a predetermined time interval before discharging it in a stream, and means for providing aeration for the aqueous waste material, as through the imparted circuitous flow;
 (e) a settling tank having means coupled to receive the discharge stream from said aeration tank, including means for separating said waste material into a waste solids-containing portion and a liquid portion;
 (f) a solids separator having means coupled to receive the waste solids-containing portion from said aeration tank; and
 (g) means receiving the liquid portion of said waste material from said settling tank including means for conveying said liquid portion to a drain.

16. An apparatus as claimed in claim 15, said trickling element comprising a trickling tower containing a plastic material media.

17. An apparatus as claimed in claim 15, said oxidation-reaction tank being a closed tank; and means for maintaining a predetermined pressure in said tank.

18. An apparatus as claimed in claim 15, said oxidation-reaction tank comprising a plurality of series-connected flow compartments for conveying said waste material therethrough in said circuitous flow path.

19. An apparatus as claimed in claim 18, comprising means for conveying an oxygen-bearing gas into the waste material flow traversing the first one of said flow compartments.

20. An apparatus as claimed in claim 19, said means for conveying an oxygen-bearing gas including an ozone supply means.

21. An apparatus as claimed in claim 19, said oxygen-bearing gas conveying means being adapted to convey said gas to the waste liquid portion discharged from said settling tank.

22. An apparatus as claimed in claim 15, comprising baffle means in said aeration tank for imparting a circuitous spiral flow pattern to the waste material conveyed through said tank.

23. An apparatus as claimed in claim 15, comprising means for adjusting the pH of said waste liquid portion discharged from said settling tank by adding muriatic acid.

24. An apparatus as claimed in claim 15, comprising means for adding chlorine to the waste liquid portion discharged from said settling tank.

* * * * *